(12) United States Patent
Warkentin et al.

(10) Patent No.: US 12,360,795 B2
(45) Date of Patent: Jul. 15, 2025

(54) LOADING MANAGEMENT HYPERVISORS FROM USER SPACE

(71) Applicant: VMware LLC, Palo Alto, CA (US)

(72) Inventors: Andrei Warkentin, South Elgin, IL (US); Sunil Kotian, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 492 days.

(21) Appl. No.: 17/716,083

(22) Filed: Apr. 8, 2022

(65) Prior Publication Data

US 2023/0325223 A1 Oct. 12, 2023

(51) Int. Cl.
*G06F 9/455* (2018.01)
*G06F 9/4401* (2018.01)

(52) U.S. Cl.
CPC ........ *G06F 9/45558* (2013.01); *G06F 9/4401* (2013.01); *G06F 9/45545* (2013.01); *G06F 2009/45575* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 8,799,429 B1 * | 8/2014 | Chatterjee | H04L 67/1097 709/222 |
| 2021/0026647 A1 * | 1/2021 | Warkentin | G06F 9/4401 |
| 2021/0026648 A1 * | 1/2021 | Warkentin | G06F 9/4401 |

* cited by examiner

*Primary Examiner* — Bing Zhao
(74) *Attorney, Agent, or Firm* — King Intellectual Asset Management

(57) ABSTRACT

Disclosed are various examples of loading management hypervisors from user space. In some examples, a host device executes a first stage bootloader of a management hypervisor from within a host operating system. The first stage bootloader loads management hypervisor data and handoff instructions into a memory of the host device, and invokes a kernel execute call of the host operating system. The handoff instructions invoke a second stage bootloader that configures and launches the management hypervisor using the management hypervisor data.

20 Claims, 4 Drawing Sheets

LOADING MANAGEMENT HYPERVISORS FROM USER SPACE

BACKGROUND

Enterprises can employ a management service that uses virtualization to provide the enterprise with access to software, data, and other resources. The management service use host devices to execute workloads that provide software services for enterprise activities. The enterprises can use other host devices to access these workloads Booting management hypervisors in traditional systems can impose a number of requirements on the system firmware. For example, Unified Extensible Firmware Interface (UEFI) firmware can use drivers for video, console, storage, network for a preboot execution environment (PXE) or other uses, and so on. These drivers can require significant investment on the side of the platform integrator, enterprises, and management services, and device providers. As a result, UEFI-based solutions can be difficult or costly to implement. Some devices can lack UEFI, or can lack a UEFI that includes drivers for all device hardware used by the management hypervisor. However, the present disclosure describes mechanisms that can execute a first stage bootloader of a management hypervisor as a Linux or POSIX-like user-space application, rather than a kernel space or other privileged mode driver or application. The first stage bootloader can use block, filesystem, network, console, and I/O facilities and system calls to a preinstalled operating system to build the boot data handoff structures including memory maps and hardware identification and descriptions for hardware resources of a host device.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure describes implementations of loading a management hypervisor from user space of a preinstalled operating system. Booting management hypervisor in traditional systems can impose a number of requirements on the system firmware. Unified Extensible Firmware Interface (UEFI) firmware can use drivers for video, console, storage, a network for a preboot execution environment (PXE) or other uses, and so on. The driver requirements can cause significant investment on the side of the platform integrator, enterprises, and management services, and device providers. As a result, UEFI-based solutions can be difficult or costly to implement. Some devices can lack firmware capable of installing the management hypervisor. For example, the devices can lack UEFI, or can lack a UEFI that includes drivers for host device hardware. However, the present disclosure describes mechanisms that can execute a first stage bootloader of a management hypervisor as a Linux or POSIX-like user-space application, rather than a privileged driver or privileged application that operates in an exception level, ring, or other privilege higher than user space. The first stage bootloader can use block, filesystem, network, console, and I/O facilities and system calls to the preinstalled operating system to build the boot data handoff structures including memory maps and hardware identification and descriptions for host hardware resources.

Figure 1:
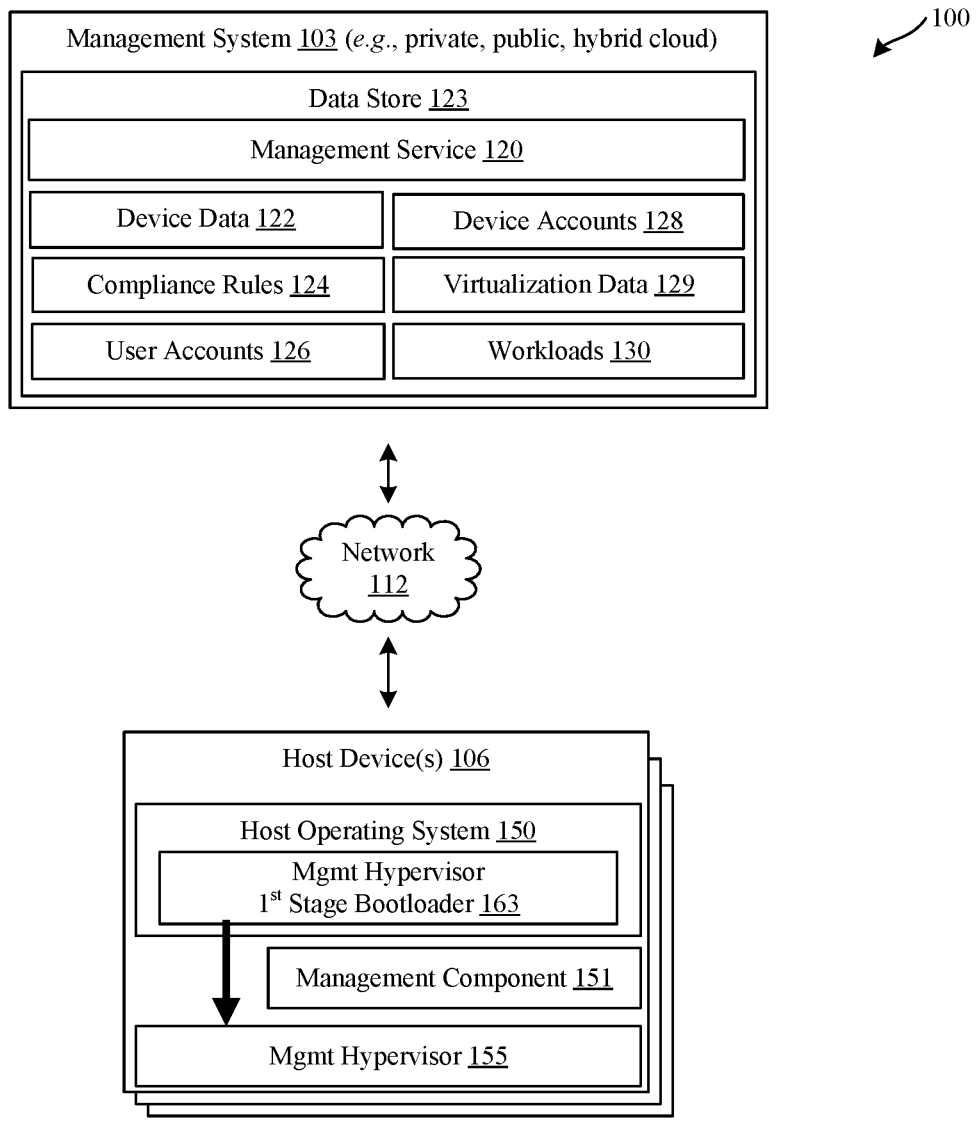
FIG. 1 is a drawing of an example of a networked environment that includes components that load a management hypervisor from user space of a preinstalled operating system, according to the present disclosure.

With reference to FIG. 1, shown is an example of a networked environment 100. The networked environment 100 can include a management system 103, host devices 106, and other components in communication with one another over a network 112. In some cases, host devices 106 can include computing devices or server computing devices of a private cloud, public cloud, hybrid cloud, and multi-cloud infrastructures. Hybrid cloud infrastructures can include public and private host computing devices. Multi-cloud infrastructures can include multiple different computing platforms from one or more service providers in order to perform a vast array of enterprise tasks.

The host devices 106 can also include devices that can connect to the network 112 directly or through an edge device or gateway. The components of the networked environment 100 can be utilized to provide virtualization solutions for an enterprise. The hardware of the host devices 106 can include physical memory, physical processors, physical data storage, and physical network resources that can be utilized by virtual machines. Host devices 106 can also include peripheral components such as the host devices 106. The host devices 106 can include physical memory, physical processors, physical data storage, and physical network resources. Virtual memory, virtual processors, virtual data storage, and virtual network resources of a virtual machine can be mapped to physical memory, physical processors, physical data storage, and physical network resources of the host devices 106. The management hypervisor 155 can provide access to the physical memory, physical processors, physical data storage, and physical network resources of the host devices 106 to perform workloads 130.

A host device 106 can, in some examples, include a DPU device, a single board computer (SBC) device, a system-on-chip (SoC) device, and other types of devices. These simple, limited, or integrated device types can lack the firmware requirements to install a management hypervisor 155. These devices can lack Unified Extensible Firmware Interface (UEFI), or can lack a UEFI that includes drivers for host device hardware. A DPU device can include networking accelerator devices, smart network interface cards, or other cards that are installed as a peripheral component to another host device 106.

The management hypervisor 155 can be integrated with the management service 120, which provides device management functionalities. The management hypervisor 155 can communicate with the management service 120 to provide access to the physical memory, physical processors, physical data storage, physical network resources, and physical accelerator resources of the host device 106 for workloads 130. The management hypervisor 155 can also communicate with the management service 120 to provide the host device 106 with access to workloads 130. However, the management hypervisor 155 may not be initially installed to the host device 106.

Virtual devices including virtual machines, containers, and other virtualization components can be used to execute the workloads 130. The workloads 130 can be managed by the management service 120 for an enterprise that employs the management service 120. Some workloads 130 can be initiated and accessed by enterprise users through client devices. The virtualization data 129 can include a record of the virtual devices, as well as the host devices 106 and host devices 106 that are mapped to the virtual devices. The virtualization data 129 can also include a record of the workloads 130 that are executed by the virtual devices.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks.

The management system 103 can include one or more host or server computers, and any other system providing computing capability. In some examples, a subset of the host devices 106 can provide the hardware for the management system 103. While referred to in the singular, the management system 103 can include a plurality of computing devices that are arranged in one or more server banks, computer banks, or other arrangements. The management system 103 can include a grid computing resource or any other distributed computing arrangement. The management system 103 can be multi-tenant, providing virtualization and management of workloads 130 for multiple different enterprises. Alternatively, the management system 103 can be customer or enterprise-specific.

The computing devices of the management system 103 can be located in a single installation or can be distributed among many different geographical locations which can be local and/or remote from the other components. The management system 103 can also include or be operated as one or more virtualized computer instances. For purposes of convenience, the management system 103 is referred to herein in the singular. Even though the management system 103 is referred to in the singular, it is understood that a plurality of management systems 103 can be employed in the various arrangements as described above.

The components executed on the management system 103 can include a management service 120, as well as other applications, services, processes, systems, engines, or functionality not discussed in detail herein. The management service 120 can be stored in the data store 123 of the management system 103. While referred to generally as the management service 120 herein, the various functionalities and operations discussed can be provided using a management service 120 that includes a scheduling service and a number of software components that operate in concert to provide compute, memory, network, and data storage for enterprise workloads and data. The management service 120 can also provide access to the enterprise workloads and data executed by the host devices 106 and can be accessed using client devices that can be enrolled in association with a user account 126 and related credentials.

The management service 120 can communicate with associated management instructions executed by host devices 106, client devices, edge devices, and IoT devices to ensure that these devices comply with their respective compliance rules 124, whether the specific host device 106 is used for computational or access purposes. If the host devices 106 or client devices fail to comply with the compliance rules 124, the respective management instructions can perform remedial actions including discontinuing access to and processing of workloads 130.

The data store 123 can include any storage device or medium that can contain, store, or maintain the instructions, logic, or applications described herein for use by or in connection with the instruction execution system. The data store 123 can be a hard drive or disk of a host, server computer, or any other system providing storage capability. While referred to in the singular, the data store 123 can include a plurality of storage devices that are arranged in one or more hosts, server banks, computer banks, or other arrangements. The data store 123 can include any one of many physical media, such as magnetic, optical, or semiconductor media. More specific examples include solid-state drives or flash drives. The data store 123 can include a data store 123 of the management system 103, mass storage resources of the management system 103, or any other storage resources on which data can be stored by the management system 103. The data store 123 can also include memories such as RAM used by the management system 103. The RAM can include static RAM (SRAM), dynamic RAM (DRAM), synchronous DRAM (SDRAM), and other types of RAM.

The data stored in the data store 123 can include management data including device data 122, enterprise data, compliance rules 124, user accounts 126, and device accounts 128, as well as other data. Device data 122 can identify host devices 106 by one or more device identifiers, a unique device identifier (UDID), a media access control (MAC) address, an internet protocol (IP) address, or another identifier that uniquely identifies a device with respect to other devices.

The device data 122 can include an enrollment status indicating whether a host computing device is enrolled with or managed by the management service 120. For example, an end-user device, an edge device, IoT devices, client devices, and other host devices 106 can be designated as "enrolled" and can be permitted to access the enterprise workloads and data hosted by host devices 106, while those designated as "not enrolled," or having no designation, can be denied access to the enterprise resources. The device data 122 can further include indications of the state of IoT devices, edge devices, end user devices, host devices 106, and other devices. While a user account 126 can be associated with a particular person as well as client devices, a device account 128 can be unassociated with any particular person, and can nevertheless be utilized for an IoT device, edge device, or another client device or host device 106 that provides automatic functionalities.

Device data 122 can also include data pertaining to user groups. An administrator can specify one or more of the host devices 106 as belonging to a user group. The user group can refer to a group of user accounts 126, which can include device accounts 128. User groups can be created by an administrator of the management service 120.

Compliance rules 124 can include, for example, configurable criteria that must be satisfied for the host devices 106 and other devices to be in compliance with the management service 120. The compliance rules 124 can be based on a number of factors, including geographical location, activation status, enrollment status, and authentication data, including authentication data obtained by a device registration system, time, and date, and network properties, among other factors associated with each device. The compliance rules 124 can also be determined based on a user account 126 associated with a user.

Compliance rules 124 can include predefined constraints that must be met in order for the management service 120, or other applications, to permit host devices 106 and other devices access to enterprise data and other functions of the management service 120. The management service 120 can communicate with management instructions on the client device to determine whether states exist on the client device which do not satisfy one or more of the compliance rules 124. States can include, for example, a virus or malware being detected; installation or execution of a blacklisted application; and/or a device being "rooted" or "jailbroken," where root access is provided to a user of the device. Additional states can include the presence of particular files, questionable device configurations, vulnerable versions of applications, vulnerable states of the client devices or another vulnerability, as can be appreciated. While the client devices can be discussed as user devices that access or initiate workloads 130 that are executed by the host devices 106, all types of devices discussed herein can also execute virtualization components and provide hardware used to host workloads 130.

The management service 120 can oversee the management and resource scheduling using hardware provided by using host devices 106. The management service 120 can oversee the management and resource scheduling of services that are provided to the host devices 106 using remotely located hardware. The management service 120 can transmit various software components, including enterprise workloads, enterprise data, and other enterprise resources for processing and storage using the various host devices 106. The host devices 106 can include a server computer or any other system providing computing capability, including those that compose the management system 103. Host devices 106 can include public, private, hybrid cloud and multi-cloud devices that are operated by third parties with respect to the management service 120. The host devices 106 can be located in a single installation or can be distributed among many different geographical locations which can be local and/or remote from the other components.

The management service 120 can include a scheduling service that monitors resource usage of the host devices 106, and particularly the host devices 106 that execute enterprise workloads 130. The management service 120 can also track resource usage of DPU devices that are installed on the host devices 106. The management service 120 can track the resource usage of DPU devices in association with the host devices 106 to which they are installed. The host device 106 can execute instructions including a host operating system 150, a management component 151 (e.g., in user space) and a management hypervisor 155.

The host operating system 150 can include an operating system that provides a user interface and an environment for applications and other instructions executed by the host device 106. The host operating system 150 can include any operating system. In some examples, the host operating system 150 can include a Linux operating system, a POSIX operating system, a Windows operating system such as Windows Server®, or another operating system.

The management component 151 can communicate with the management service 120 for scheduling of workloads 130 executed using virtual resources that are mapped to the physical resources of one or more host device 106. The management component 151 can communicate with the management hypervisor 155 to deploy virtual devices that perform the workloads 130. In various embodiments, the management component 151 can be separate from, or a component of, the management hypervisor 155.

The management hypervisor 155 can include a bare metal or type 1 hypervisor that can provide access to the physical memory, physical processors, physical data storage, and physical network resources of the host devices 106 to perform workloads 130. A management hypervisor 155 can create, configure, reconfigure, and remove virtual machines and other virtual devices on a host device 106. The management hypervisor 155 can also relay instructions from the management service 120 to the management hypervisor 155. In other cases, the management service 120 can communicate with the management hypervisor 155 directly. The management hypervisor 155 can identify that a workload 130 or a portion of a workload 130 includes instructions that can be executed using the host device 106.

The management hypervisor 155 can operate independently from the host operating system. As a result, the host operating system 150 can include a preinstalled operating system that is preinstalled and packaged by the manufacturer or vendor of the host device 106, or another operating system. In some examples, a preinstalled host operating system 150 can be replaced with another host operating system 150 prior to execution of the management hypervisor first stage bootloader 163. Alternatively, a preinstalled host operating system 150 can be replaced with another host operating system 150 by the management hypervisor 155 or during the installation process of the management hypervisor 155.

The management hypervisor first stage bootloader 163 can be considered a portion of the management hypervisor 155 that runs as a user space application in the host operating system 150. The management hypervisor first stage bootloader 163 can be configured to execute during a boot process or as a startup process of the host operating system 150. The management hypervisor first stage bootloader 163 can load a kernel of the management hypervisor 155 into host memory, build and load boot data handoff structures that enable the management hypervisor 155 to use hardware resources of the host device 106, load 'trampoline' or 'handoff' instructions into host main memory, and invoke a kernel execute system call of the host operating system 150. The kernel execute system call can cause the host device 106 to reboot and execute the handoff instructions or handoff region in host memory. The kernel execute call can be invoked at a physical address or address region corresponding to the handoff instructions. The handoff instructions can move the management hypervisor 155 kernel and/or other data loaded into memory by the management hypervisor first stage bootloader 163 into memory areas that are unavailable to user space applications such as the first stage bootloader.

Figure 2:
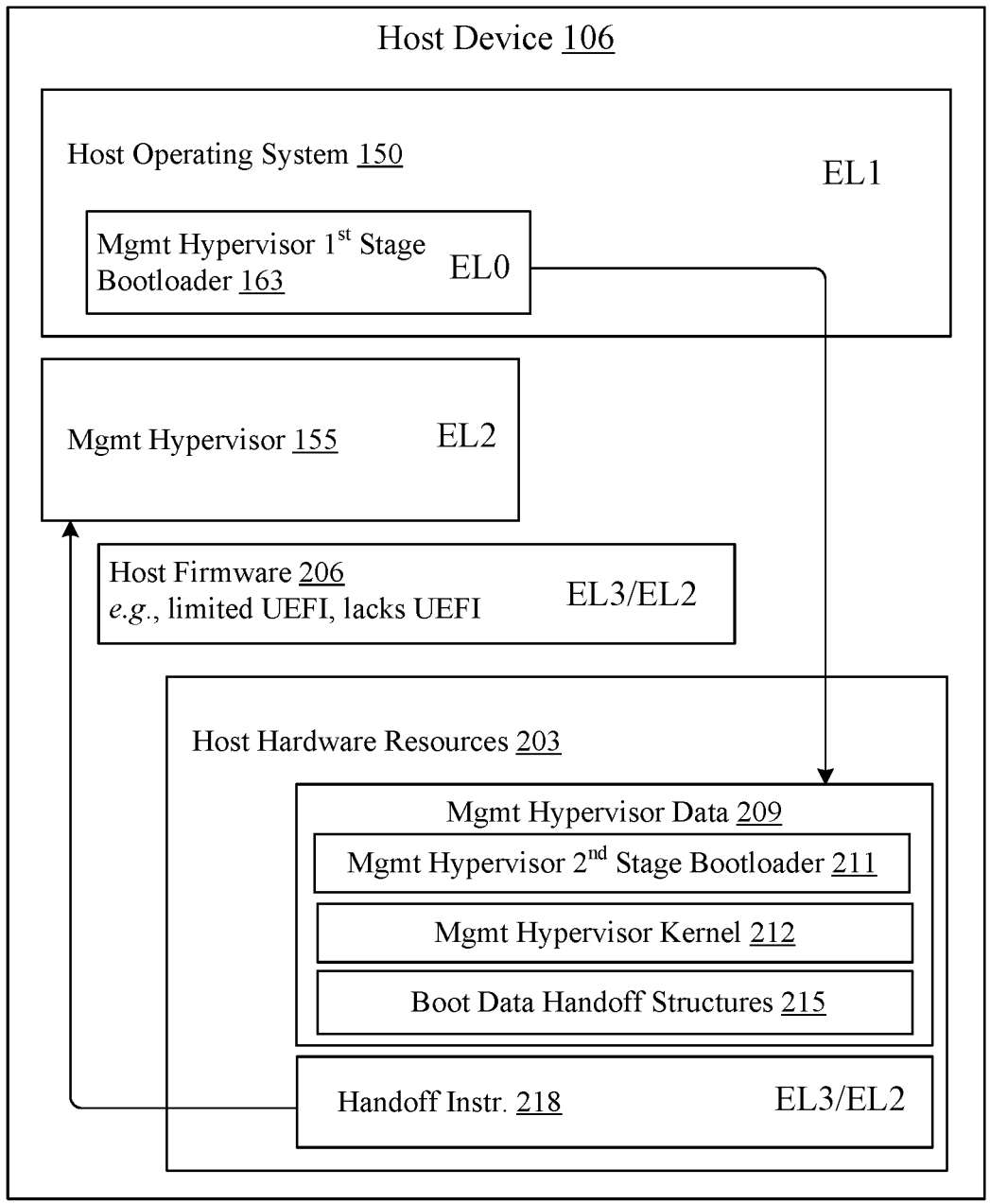
FIG. 2 is a drawing of an example of a host device that loads a management hypervisor from user space of a preinstalled operating system, according to the present disclosure.

FIG. 2 shows an example of the host device 106 that loads a management hypervisor 155 from user space of a host operating system 150. The host device 106 can include host hardware resources 203, host firmware 206, the host operating system 150, and the management hypervisor 155.

The host hardware resources 203 can include a main processor such as an ARM processor or another RISC- or CISC-based processor. The host hardware resources 203 can include one or more memory including flash, Non-Volatile Memory Express (NVMe) devices, and other memory devices. The host hardware resources 203 can include specialized ASICs including a network interface card (NIC) ASICs, network processing units (NPU) ASICs, field programmable gate array (FPGA) based ASICs, software switches, Programming Protocol-independent Packet Processors (P4) devices, NVIDIA® ConnectX®-6 Dx (CX6) devices, and others.

The host firmware 206 can include Trusted Firmware A (TF-A), Unified Extensible Firmware Interface (UEFI) or another publicly available specification that defines a software interface, Advanced Configuration and Power Interface, a power management specification (ACPI) or another power management firmware, and other firmware for the host device 106. However, as indicated earlier, the host firmware 206 can lack UEFI or can include a UEFI that has insufficient drivers for the host hardware resources 203. This can cause the UEFI to be unable to initialize, load, and execute the management hypervisor 155.

The management hypervisor first stage bootloader 163 can be configured to execute during a boot process or as a startup process of the host operating system 150. The management hypervisor first stage bootloader 163 can load management hypervisor data 209 into host memory.

The management hypervisor data 209 can include a management hypervisor kernel 212 and boot data handoff structures 215. The boot data handoff structures 215 can include memory maps for host memory, memory locations for the management hypervisor kernel 212, as well as descriptions and identifications of host hardware resources 203. In order to build the boot data handoff structures 215, the management hypervisor first stage bootloader 163 can use block, filesystem, network, and console I/O as necessary. Alternatively, the boot data handoff structures 215 can be predetermined for the host device 106 and included in, or side loaded for access by, the management hypervisor first stage bootloader 163.

The management hypervisor first stage bootloader 163 can run in its own virtual address space. When the management hypervisor first stage bootloader 163 needs to identify memory into which to load a boot module for the management hypervisor 155 or another boot data handoff structure 215, it can use system calls to the host operating system 150. The system calls can include malloc, memalign, mmap, mlock, and other calls. However, the memory and other hardware addresses returned have no meaning outside of the management hypervisor first stage bootloader 163 process. For example, the addresses can be virtual addresses. The management hypervisor first stage bootloader 163 can translate these to physical or machine addresses, and use physical addresses to build the boot data handoff structures 215. In the example where the host operating system 150 is a Linux operating system, the method for translating can include using a /proc/self/pagemap mechanism or another pagemap mechanism to translate addresses, where self refers to a process identifier for the management hypervisor first stage bootloader 163. This interface can include a file in the host operating system 150 file system in the location that can be specified using /proc/self/pagemap. The memory allocate call or malloc call can be pinned to avoid from getting paged out. Pinned memory can refer to virtual memory pages that are specially marked so that they cannot be paged out based on system API function calls that can pin or prevent paging out of the memory. This can include mlock calls for allocated memory. The management hypervisor first stage bootloader 163 can identify or capture memory data for the boot data handoff structures 215 and management hypervisor kernel 212 by parsing /proc/firmware/memmap, /sys/firmware/memmap, or another interface or file that provides a raw memory map to userspace.

In some examples such as when the management hypervisor 155 is booting using UEFI, ACPI/DeviceTree and System Management BIOS (SMBIOS) data can be identified from UEFI of the host firmware 206 by parsing system table and configuration table interfaces or files available to userspace. The system table interface or file can be accessed using /sys/firmware/efi/systab. The configuration table interface or file available from userspace can be accessed through /sys/firmware/efi/config table. Runtime UEFI regions can be ignored. In some examples request Tracker (RT) services are not or cannot be reused due to different virtual address ranges used for RT by the SPU provider OS 161 and the management hypervisor 155 and the management hypervisor first stage bootloader 163.

However, the management hypervisor first stage bootloader 163 can include non-UEFI data identification and definition mechanisms as well. If UEFI is not used, a device tree can be used verbatim from a user space device tree interface or file such as /proc/devicetree or an ACPI/DeviceTree loaded from file. The device tree can be a data structure and language for identifying and describing hardware. This can be a portion of the boot data handoff structures 215 that includes a description of host hardware that is readable by the management hypervisor 155 so that the management hypervisor kernel 212 doesn't need to hard code machine details of the host device 106. Video framebuffer device information can be initialized using a user space interface or file such as /dev/fb0. The video framebuffer data can also be part of the boot data handoff structures 215.

The management hypervisor first stage bootloader 163 can provide boot data handoff structures 215 to enable the management hypervisor 155 and the second stage bootloader 211 to use hardware resources of the host device 106, load handoff or handoff instructions 218 into host memory, and invoke a kernel execute system call of the host operating system 150. The kernel execute system call can cause the host device 106 to reboot and execute the handoff instructions 218. The handoff instructions 218 can move the management hypervisor 155 kernel and other data loaded into memory by the management hypervisor first stage bootloader 163 into memory areas that are unavailable to user space applications such as the first stage bootloader. The handoff instructions 218 can be referred to as management hypervisor handoff instructions or management hypervisor handoff instructions that prepare the host device 106 for execution of the management hypervisor 155 once the kernel execute call is invoked.

The management hypervisor first stage bootloader 163 can identify information for management hypervisor data 209 including how much physical memory there is, which portions of the physical memory are unusable to boot the management hypervisor 155, and where to initially and ultimately place the management hypervisor second stage bootloader 211, the management hypervisor kernel 212, the boot data handoff structures 215, and other data. Since there is a host operating system 150 currently in memory, but it will no longer be in memory once the management hypervisor 155 is executed, one or more of the management hypervisor kernels 212 and the boot data handoff structures 215 can be initially loaded into one location in host memory, and then moved into a memory location previously occupied by the host operating system 150 by the handoff instructions 218. The handoff instructions 218 can also move these items into other memory locations that are unavailable to the management hypervisor first stage bootloader 163 based on the existence of other data that will be cleared or areas that are not available from user space.

The management hypervisor second stage bootloader 211 can be a kernel space bootloader. The management hypervisor second stage bootloader 211 can validate the management hypervisor kernel 212, and other boot modules and proceed with launching the management hypervisor 155 using the boot data handoff structures 215 stored in host memory. The host memory can refer to static RAM (SRAM), dynamic RAM (DRAM), synchronous DRAM (SDRAM), and other types of RAM and other memories. The handoff instructions 218 can launch the management hypervisor second stage bootloader 211 with a predetermined set of options as well as provided memory locations of the boot data handoff structures 215.

The management hypervisor 155 can operate in EL2 privilege level. Exception levels (e.g., EL0, EL1, EL2, EL3) can correspond to Advanced RISC Machine (ARM) privilege levels. EL0 can refer to application mode or user space privilege, EL1 can refer to kernel space or rich OS privilege, EL2 can refer to hypervisor privilege, and EL3 can refer to firmware or secure monitor privilege level. The discussion can include reference to exception levels since some host devices 106 can include ARM processors as a main processor. RISC-V privilege levels can include user-mode (U-mode), supervisor mode (S-mode), and machine mode (M-mode). In a RISC-V host device 106 implementation, U-mode can correspond to a user space privilege, S-mode can correspond to kernel, operating system, and/or hypervisor privilege, and machine mode can correspond to firmware or secure monitor privilege. However, other host devices 106 can include other processor types and privilege levels corresponding to other labels and designations such as ring levels of x86 devices.

Figure 3:
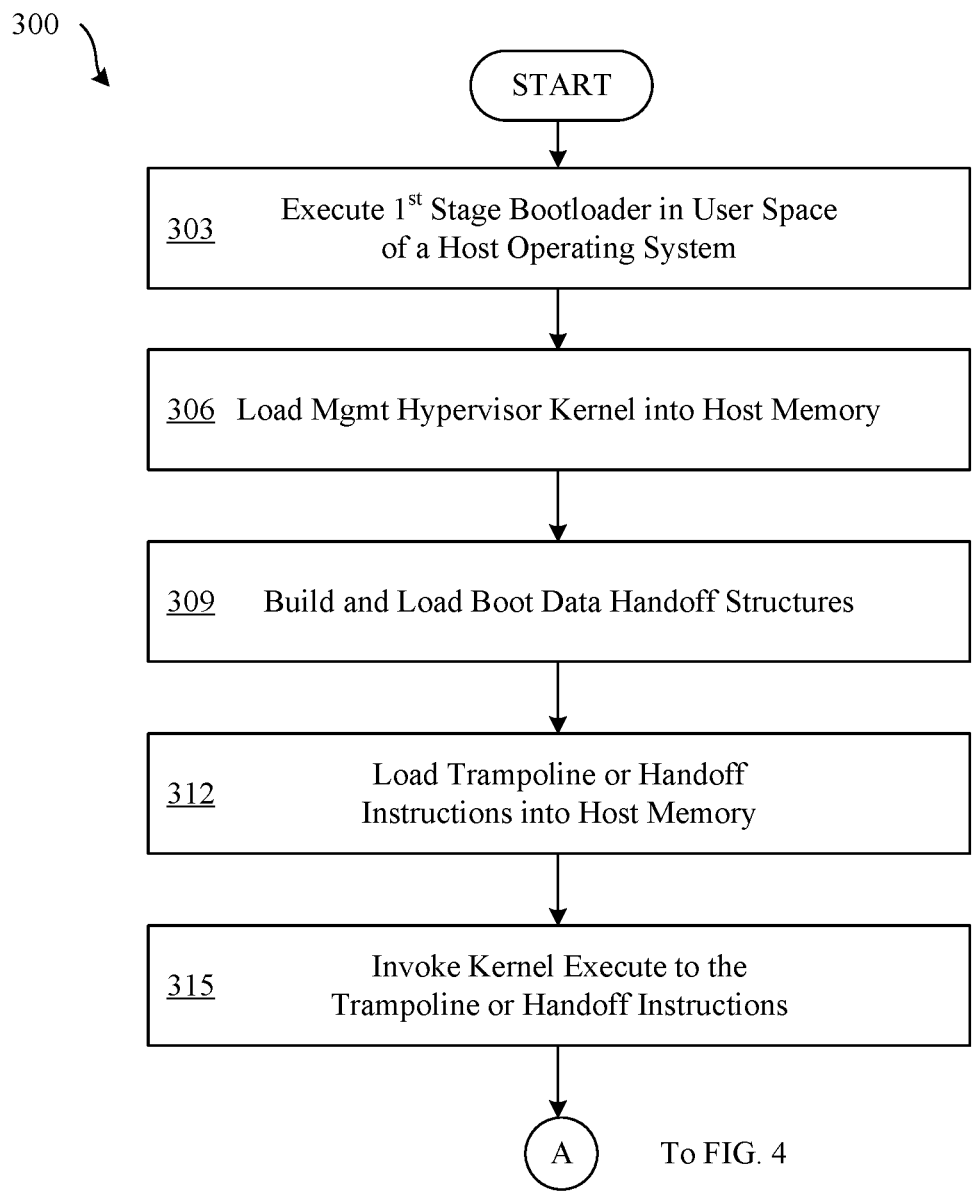
FIG. 3 is a flowchart illustrating functionality implemented by components of the networked environment, according to the present disclosure.

FIG. 3 shows a flowchart 300 that provides an example of the operation of components of the networked environment 100. Generally, this figure provides an example of functionality of a management hypervisor first stage bootloader 163 that loads a management hypervisor 155 from user space of a host operating system 150. While a particular step can be discussed as being performed by a particular hardware or software component of the networked environment 100, other components can perform aspects of that step.

In step 303, the host device 106 can execute a management hypervisor first stage bootloader 163. The management hypervisor first stage bootloader 163 can be considered a portion of the management hypervisor 155 that runs as a user space application in the host operating system 150. The management hypervisor first stage bootloader 163 can be configured to execute during a boot process or as a startup process of the host operating system 150.

In step 306, the management hypervisor first stage bootloader 163 can load a management hypervisor second stage bootloader 211 and a management hypervisor kernel 212 into main CPU memory 208. The main CPU memory 208 areas or address range for the management hypervisor second stage bootloader 211 and the management hypervisor kernel 212 can be pinned using a system call. The management hypervisor first stage bootloader 163 can identify memory into which to load the management hypervisor kernel 212 by system calls to the host operating system 150 to identify virtual memory addresses. The management hypervisor first stage bootloader 163 can translate the addresses returned by the system call into physical or machine addresses for the management hypervisor kernel 212. Translation can be performed using a pagemap mechanism.

In step 309, the management hypervisor first stage bootloader 163 can build and load boot data handoff structures 215. The management hypervisor first stage bootloader 163 can use block, filesystem, network, console, and I/O facilities and system calls to the host operating system 150 to build the boot data handoff structures 215. The structures can include modules of the management hypervisor 155, memory maps of the host device 106, and hardware identification and descriptions for host hardware resources 203 of the host device 106.

The management hypervisor first stage bootloader 163 can identify memory into which to load the boot data handoff structures 215 by system calls to the host operating system 150 to identify virtual memory addresses, and translating these addresses into physical machine addresses. The host memory areas or address ranges for the boot data handoff structures 215 can be pinned using a system call.

In step 312, the management hypervisor first stage bootloader 163 can load handoff instructions 218 into memory of the host device 106. The management hypervisor first stage bootloader 163 can identify memory into which to load the handoff instructions 218 by system calls to the host operating system 150 to identify virtual memory addresses, and translate these addresses into physical machine addresses. The host memory areas or address ranges for the handoff instructions 218 can be pinned using a system call.

In step 315, the management hypervisor first stage bootloader 163 can invoke a kernel execute system call to the handoff instructions 218. The kernel execute system call can be called to the handoff instructions 218, and the handoff instructions 218 can further prepare the host device 106 for execution of the management hypervisor 155 using kernel space facilities that are unavailable to the management hypervisor first stage bootloader 163 as a user space application. The handoff instructions 218 can also call a management hypervisor second stage bootloader 211, which can further prepare the host device 106 and launch or execute the management hypervisor 155.

Figure 4:
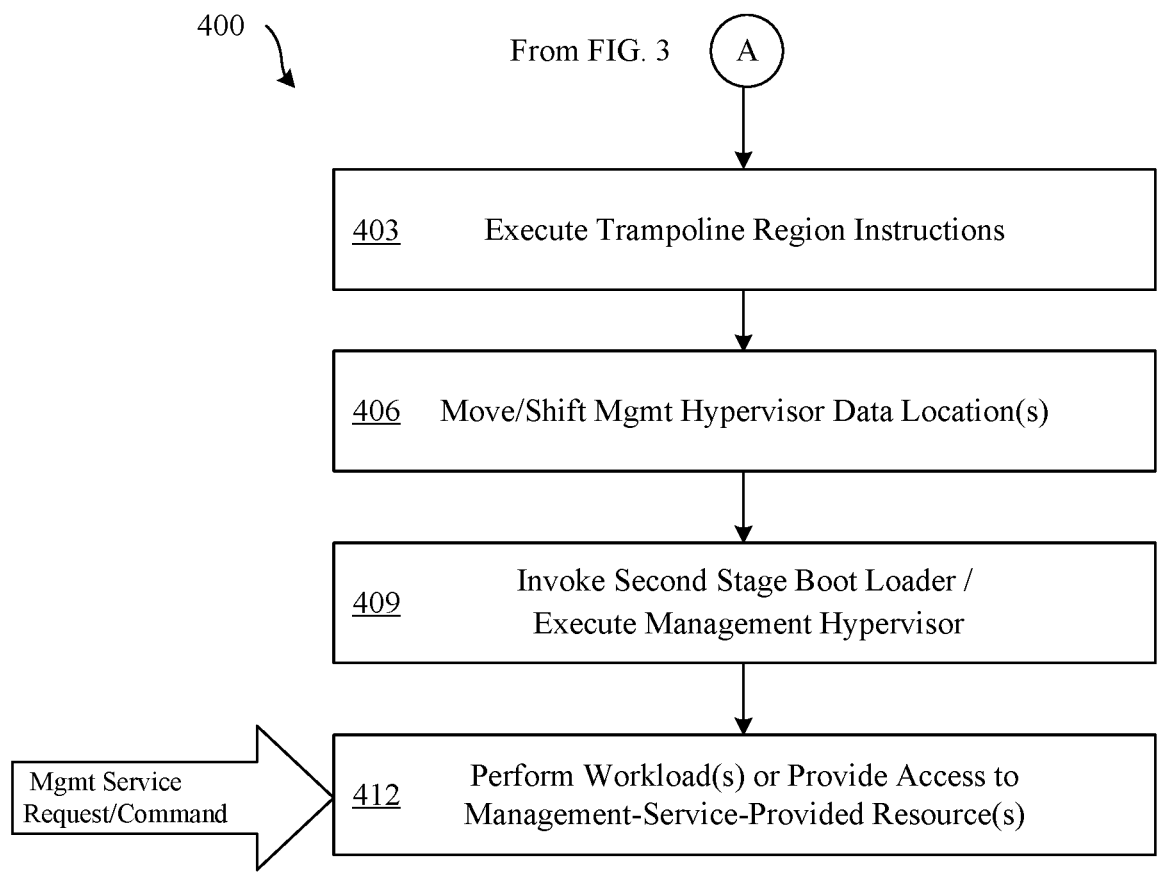
FIG. 4 is a flowchart illustrating additional functionality implemented by components of the networked environment, according to the present disclosure.

FIG. 4 shows a flowchart 400 that provides an example of the operation of components of the networked environment 100. Generally, this figure provides an example of functionality of a handoff instructions 218 invoked to execute from user space. The handoff instructions 218 can perform actions that load and execute a management hypervisor 155. While a particular step can be discussed as being performed by a particular hardware or software component of the networked environment 100, other components can perform aspects of that step.

In step 403, the handoff instructions 218 can be executed. The handoff instructions 218 can be executed based on a kernel execute system call to the handoff instructions 218. A user space application such as the management hypervisor first stage bootloader 163 can perform the kernel execute system call that specifies a physical address or address region of the handoff instructions 218.

In step 406, the handoff instructions 218 can move or shift management hypervisor data 209. In various examples, the management hypervisor kernel 212, the second stage bootloader, the boot data handoff structures 215 can be in a suboptimal location. The handoff instructions 218 can be configured to move all or a portion of the management hypervisor data 209. One benefit of the trampoline or handoff instructions 218 is that some kernel execute calls can be limited to a predetermined number of segments such as 16 or another number, which can make a direct call to the second stage bootloader or another portion of the management hypervisor 155 problematic.

In step 409, the handoff instructions 218 can invoke a second stage bootloader of the management hypervisor 155. The handoff instructions 218 can invoke the second stage bootloader along with a pointer to the physical address of the boot data handoff structures 215. The second stage bootloader can further prepare the host device 106 using the boot data handoff structures 215 and then execute the management hypervisor 155 using the management hypervisor kernel 212.

In step 412, the host device 106 can perform a workload 130 using the host hardware resources 203 or provide the host device 106 with access to a workload 130 executed using a remotely located host device 106. The host device 106 can receive a command to perform a workload 130 through the management hypervisor 155. The host device 106 can perform the workload 130 using host hardware resources 203 that are accessed using the management hypervisor 155. The host device 106 can transmit a request for access to a workload 130, or can receive a command to provide the host device 106 with access to a workload 130. The management hypervisor 155 can provide access to the workload 130 or other management service or enterprise resources such as data stores, applications, and other resources.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory devices can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Although the various services and functions described herein can be embodied in software or code executed by general purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagrams and flowcharts can show examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or another system. The machine code can be converted from the source code. If embodied in hardware, each block can represent a circuit or a number of interconnected circuits to implement the specified logical function(s).

Although sequence diagrams and flowcharts can be shown in a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as a processor in a computer system or another system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included in the following claims herein, within the scope of this disclosure.

Therefore, the following is claimed:

1. A non-transitory computer-readable medium comprising executable instructions, wherein the instructions, when executed by at least one processor, cause at least one computing device to at least:

execute, by a host device and from within a host operating system, a first stage bootloader of a management hypervisor as a user space application of the host operating system, wherein the first stage bootloader builds at least one boot data handoff structure in user space of the host operating system based at least in part on files read from a file system of the host operating system;

load, by the first stage bootloader, management hypervisor data and handoff instructions into a memory of the host device;

invoke, by the first stage bootloader, a kernel execute call of the host operating system, the kernel execute call specifying a physical address of the handoff instructions; and invoke, by the handoff instructions, a second stage bootloader that configures and launches the management hypervisor using the management hypervisor data.

2. The non-transitory computer-readable medium of claim 1, wherein the management hypervisor data comprises the at least one boot data handoff structure.

3. The non-transitory computer-readable medium of claim 1, wherein the at least one boot data handoff structure comprises: a memory map of physical memory addresses of the memory of the host device.

4. The non-transitory computer-readable medium of claim 1, wherein the at least one boot data handoff structure comprises: device tree data of the host device.

5. The non-transitory computer-readable medium of claim 1, wherein the at least one boot data handoff structure comprises: video framebuffer data of the host device.

6. The non-transitory computer-readable medium of claim 1, wherein the management hypervisor data comprises a management hypervisor kernel of the management hypervisor.

7. The non-transitory computer-readable medium of claim 1, wherein the handoff instructions move or shift at least a portion of the management hypervisor data.

8. A system, comprising:
at least one computing device comprising at least one processor; and
a data store comprising executable instructions, wherein the instructions, when executed by the at least one processor, cause the at least one computing device to at least:
execute, by a host device and from within a host operating system, a first stage bootloader of a management hypervisor as a user space application of the host operating system, wherein the first stage bootloader builds at least one boot data handoff structure in user space of the host operating system based at least in part on files read from a file system of the host operating system;

load, by the first stage bootloader, management hypervisor data and handoff instructions into a memory of the host device;

invoke, by the first stage bootloader, a kernel execute call of the host operating system, the kernel execute call specifying a physical address of the handoff instructions; and invoke, by the handoff instructions, a second stage bootloader that configures and launches the management hypervisor using the management hypervisor data.

9. The system of claim 8, wherein the management hypervisor data comprises the at least one boot data handoff structure.

10. The system of claim 8, wherein the at least one boot data handoff structure comprises: a memory map of physical memory addresses of the memory of the host device.

11. The system of claim 8, wherein the at least one boot data handoff structure comprises: device tree data of the host device.

12. The system of claim 8, wherein the at least one boot data handoff structure comprises: video framebuffer data of the host device.

13. The system of claim 9, wherein the management hypervisor data comprises a management hypervisor kernel of the management hypervisor.

14. The system of claim 8, wherein the handoff instructions move or shift at least a portion of the management hypervisor data.

15. A method, comprising:
executing, by a host device and from within a host operating system, a first stage bootloader of a management hypervisor as a user space application of the host operating system, wherein the first stage bootloader builds at least one boot data handoff structure in user space of the host operating system based at least in part on files read from a file system of the host operating system;

loading, by the first stage bootloader, management hypervisor data and handoff instructions into a memory of the host device;

invoking, by the first stage bootloader, a kernel execute call of the host operating system, the kernel execute call specifying a physical address of the handoff instructions; and invoking, by the handoff instructions, a second stage bootloader that configures and launches the management hypervisor using the management hypervisor data.

16. The method of claim 15, wherein the management hypervisor data comprises the at least one boot data handoff structure.

17. The method of claim 15, wherein the at least one boot data handoff structure comprises: a memory map of physical memory addresses of the memory of the host device.

18. The method of claim 15, wherein the at least one boot data handoff structure comprises: device tree data of the host device.

19. The method of claim 15, wherein the at least one boot data handoff structure comprises: video framebuffer data of the host device.

20. The method of claim 15, wherein the management hypervisor data comprises a management hypervisor kernel of the management hypervisor.

* * * * *